United States Patent
Zhang et al.

(10) Patent No.: US 12,215,406 B1
(45) Date of Patent: Feb. 4, 2025

(54) METHOD FOR REMOVING ARSENIC FROM COPPER SMELTING SOOT AND COMPREHENSIVE RECOVERY OF VALUABLE METALS

(71) Applicant: SHANDONG HUMON SMELTING CO., LTD., Yantai (CN)

(72) Inventors: Junfeng Zhang, Yantai (CN); Lei Wang, Yantai (CN); Changqing Chu, Yantai (CN); Chenglin Li, Yantai (CN); Huinan Zhang, Yantai (CN); Minglei Shan, Yantai (CN); Junqing Zhao, Yantai (CN); Yandong Zhang, Yantai (CN); Feng Zhang, Yantai (CN); Guotao Yang, Yantai (CN); Yuling Niu, Yantai (CN)

(73) Assignee: SHANDONG HUMON SMELTING CO., LTD., Yantai (CN)

( * ) Notice: Subject to any disclaimer, the term of this patent is extended or adjusted under 35 U.S.C. 154(b) by 0 days.

(21) Appl. No.: 18/798,726

(22) Filed: Aug. 8, 2024

(51) Int. Cl.
| | |
|---|---|
| *C22B 15/00* | (2006.01) |
| *C22B 3/00* | (2006.01) |
| *C22B 3/12* | (2006.01) |
| *C22B 3/22* | (2006.01) |
| *C22B 13/02* | (2006.01) |
| *C22B 30/06* | (2006.01) |
| *C22B 58/00* | (2006.01) |

(52) U.S. Cl.
CPC .............. *C22B 15/008* (2013.01); *C22B 3/12* (2013.01); *C22B 3/22* (2013.01); *C22B 13/02* (2013.01); *C22B 13/04* (2013.01); *C22B 15/0086* (2013.01); *C22B 19/24* (2013.01); *C22B 30/06* (2013.01); *C22B 58/00* (2013.01)

(58) Field of Classification Search
CPC .......... C22B 15/008; C22B 3/12; C22B 3/22; C22B 19/24; C22B 30/06; C22B 13/02; C22B 13/04; C22B 15/086
USPC .......................................................... 75/429
See application file for complete search history.

(56) References Cited

FOREIGN PATENT DOCUMENTS

| | | |
|---|---|---|
| CN | 102534228 A | 7/2012 |
| CN | 104004916 A | 8/2014 |
| CN | 106834708 A | 6/2017 |
| CN | 108034830 B | 4/2019 |
| CN | 113149310 A | 7/2021 |
| CN | 118166208 B | 7/2024 |
| JP | 2015214760 A | 12/2015 |

*Primary Examiner* — Melissa S Swain
(74) *Attorney, Agent, or Firm* — George Liu

(57) ABSTRACT

Provided is a method for removing arsenic from copper smelting soot and comprehensive recovery of valuable metals. According to the method, a metal leaching synergist is prepared through thiol-ene click chemical reaction, which is capable of reacting more effectively with arsenic and metal impurities in the copper smelting soot due to its special chemical structure, thereby improving leaching efficiency; and the cage-like structure of the polysilsesquioxane provides excellent chemical stability, the removal rate of harmful substances in the copper smelting soot can be increased by using the synergist, environmental pollution is reduced, meanwhile, the recovery rate of metal resources is increased, and the requirements of green chemistry and sustainable development are met. The present disclosure realizes the centralized management of As and also realizes the step-by-step recovery of valuable metals such as Cu, Zn, Pb, Bi, and In.

5 Claims, No Drawings

METHOD FOR REMOVING ARSENIC FROM COPPER SMELTING SOOT AND COMPREHENSIVE RECOVERY OF VALUABLE METALS

TECHNICAL FIELD

The present disclosure herein relates to the technical field of comprehensive treatment of solid waste in non-ferrous metal smelting processes, especially a method for removing arsenic from copper smelting soot and comprehensive recovery of valuable metals.

BACKGROUND

During the pyrometallurgical copper smelting process, certain volatile elements present in the copper concentrate, including Pb, Zn, In, Cd, Bi, and As, are volatilized into the flue gas. These elements are then collected and concentrated in the soot through dust collection. In addition to these elements, various other valuable elements enter the soot due to airflow mechanical entrainment and the like.

The Chinese patent application with the publication number CN104004916A discloses a copper smelting ash leaching residue bottom blowing reduction smelting multi-metal trapping process, which comprises the following steps: mixing lead, silver and bismuth residues, copper slag, scrap iron, coal granules, solvents, reducing agents and return dust, feeding the mixture into a bottom blowing furnace through a feeding hole, spraying oxygen-enriched gas into the furnace through a bottom spray gun, finishing high-efficiency reduction smelting to obtain copper and sulfur reducing slag, flue gas and coarse lead, and drying the materials through high-temperature glue gas of a rotary dry kiln, wherein the oxygen-enriched air is a mixture of oxygen and natural gas; an angle of 0-27 degrees is formed between the furnace bottom spray gun and a vertical line; the oxygen flow is 70-100 m$^3$/h, and the pressure of oxygen is 0.4-0.7 MPa; the flow of the natural gas is 50-70 m$^3$/h, and the pressure of the natural gas is 0.4-0.75 MPa; the temperature in a smelting area is 1150-1250° C.; the depth of a molten bath is 800-1000 cm; the negative pressure in the furnace is 50-150 P.

The Chinese patent with authorization announcement number CN102534228B discloses a method for comprehensively recovering valuable elements from high-arsenic-containing copper smelting soot. According to the method, the valuable elements zinc, copper, lead and tin in the high-arsenic-containing copper smelting soot are comprehensively recovered by carrying out the processes of (oxygen-enrichment) roasting, leaching, extracting, replacing and crystallizing on the high-arsenic-containing copper smelting soot.

The Chinese patent with the authorization announcement number CN108034830B discloses a method for comprehensively recovering valuable metal from copper smelting ash. Firstly, a magnetic separation method is adopted to primarily separate the copper smelting ash to obtain iron-enriched ash and low-iron ash; the iron-enriched ash is leached by sulfuric acid to obtain iron-enriched slag and copper sulfate solution; the low-iron ash is neutrally leached to obtain neutral leaching slag and neutral leaching liquid; the neutral leaching slag is leached by low-acid liquid to obtain high-lead bismuth slag and acid leaching liquid; the acid leaching liquid is neutrally leached again; the neutral leaching liquid is reduced by $SO_2$ to obtain $As_2O_3$ and copper sulfate solution; and the copper sulfate solution is electrodeposited to obtain pure copper.

The aforementioned patents and prior arts are for comprehensive recovery of valuable metals. Most domestic copper smelting companies return the soot directly to the smelting system for processing. However, after the soot directly returns to the copper system, the flash furnace's processing capacity is reduced, the furnace condition is deteriorated, and additionally, the harmful components such as Pb, Zn, and As in the furnace charge are increased, directly influencing the quality of the final product through the cyclic accumulation of harmful impurities.

SUMMARY

The purpose of the present disclosure is to solve the current problems that the processing capacity of flash furnaces is influenced in the process of comprehensively recovering valuable metals, harmful components such as Pb, Zn and As in the furnace charge are increased and the like, and a method for removing arsenic and comprehensive recovery of valuable metals from copper smelting soot is provided. The method comprises the following steps: performing pretreatment and subjecting oxidative acid leaching; specifically, washing the pretreated leaching residue with water and subsequently sending it for oxidative acid leaching; the oxidative acid leaching adopts a two-stage countercurrent method, and the operation steps are as follows:

A1 first-stage leaching: continuously introducing air during the leaching process, adding water and stirring, maintaining a liquid-to-solid ratio (3-4): 1 and a temperature of 70-80° C., adding 60-70 g/L sulfuric acid, and reacting for 2-4 h; subsequently extracting In from the leachate using tributyl phosphate; then extracting Cu from the raffinate; and finally preparing basic zinc carbonate from the raffinate; and A2 second-stage leaching: continuously introducing air during the leaching process, adding water and stirring, maintaining a liquid-to-solid ratio of (3-4): 1 and a temperature of 70-80° C., adding 120-130 g/L sulfuric acid, 10-15 g/L sodium chloride, and 0.02-0.3 g/L metal leaching synergist, reacting for 2-4 h, and returning the second-stage leachate to the first-stage leaching process, and recycling for reuse; subsequently, neutralizing and hydrolyzing the leachate to separate Bi; finally reducing and smelting the leaching residue to recover Pb.

In the above method, the pretreatment operation steps are as follows:

Step 1, alkali leaching: adding copper smelting soot into a stirring kettle, adding water and stirring, maintaining a liquid-to-solid ratio of (4-5): 1, continuously adding 40-50 g/L of sodium hydroxide and 30-40 g/L of sodium sulfide, heating to increase the temperature, soaking and filtering to obtain the leachate and leaching residue;

Step 2 sedimentation: adding 10-20 g/L of lime into the leachate from Step 1, precipitating and filtering, continuously adding 5-10 g/L of polyaluminum chloride into the filtrate for flocculation and sedimentation to obtain filtrate and filter residue; and the filter residue is arsenic residue; and Step 3: the filtrate from Step 2 is returned to the stirring kettle of Step 1 and used as a circulating liquid; and the leaching residue from Step 1 is sent for oxidative acid leaching for further treatment.

In the above method, the main components of the copper smelting soot include: 7.18% Cu, 23.05% Pb, 4.09% Bi, 10.91% Zn, 6.01% As, 1.56% Cd, 4.05% Fe, 1.18% Sn, 0.595% Sb, and 0.021% In.

In the above method, the soaking temperature of Step 1 is 60-70° C., the leaching time is 60-120 min, and the stirring speed is 500-600 rpm.

In the above method, the preparation method of the metal leaching synergist is as follows:

according to parts by weight, stirring 5-10 parts of 1,3,5-triazine-2,4,6 (1H,3H,5H)-trithione, trisodium salt, 0.07-0.2 part of 5,10,15,20-tetrakis(4-vinylphenyl) porphyrin, 0.6-2.5 parts of acrylo polysilsesquioxane cage mixture (CAS: 221326-46-1), 120-160 parts of toluene, and 0.5-2.5 parts of photoinitiator, reacting for 50-100 minutes under the irradiation of 365 nm ultraviolet light, and then removing the toluene via reduced pressure distillation after the reaction is finished, to obtain the metal leaching synergist.

In the above method, the photoinitiator is one of 2,2-dimethoxy-2-phenylacetophenone, benzophenone, benzoin dimethyl ether and isopropyl thioxanthone.

Reaction mechanism of metal leaching synergist:
under irradiation, photoinitiators (such as the abovementioned benzoin dimethyl ether, benzophenone, etc.) are activated to generate free radicals; and the free radicals generated by the photoinitiator react with the mercapto groups in 1,3,5-triazine-2,4,6 (1H,3H,5H)-trithione, trisodium salt, forming sulfhydryl radicals.

The sulfhydryl radical is then subjected to an addition reaction with the vinyl double bond in 5,10,15,20-tetrakis (4-vinylphenyl) porphyrin and acrylo polysilsesquioxane cage mixture to form thioether bonds, thereby binding the triazine, porphyrin structure and polysilsesquioxane backbone together.

Compared with the prior art, the present disclosure has the following beneficial effects:

1. in the present disclosure, a metal leaching synergist is prepared through thiol-ene click chemical reaction, which is capable of reacting more effectively with arsenic and metal impurities in the copper smelting soot due to its special chemical structure, thereby improving leaching efficiency; and the cage-like structure of the polysilsesquioxane provides excellent chemical stability, the removal rate of harmful substances in the copper smelting soot can be increased by using the synergist, environmental pollution is reduced, meanwhile, the recovery rate of metal resources is increased, and the requirements of green chemistry and sustainable development are met.

2. The copper smelting soot of the present disclosure adopts an alkali leaching arsenic removal pretreatment and two-stage countercurrent oxidation acid leaching process, that is, the copper smelting soot is subjected to alkali leaching through a sodium hydroxide and sodium sulfide system to remove the AS, thereby achieving centralized treatment of AS; the leachate is then subjected to sedimentation AS treatment through lime precipitation and polyaluminum chloride flocculation and sedimentation, alkali liquor can be recycled for reuse, and leaching residues are sent for oxidative acid leaching; and the oxidative acid leaching adopts a two-stage countercurrent method, and after acid leaching, after extraction, step-by-step recovery of valuable metals such as Cu, Zn, Pb, Bi and In is realized.

DETAILED DESCRIPTION OF THE EMBODIMENTS

Various exemplary embodiments of the present disclosure will now be described in detail, and this detailed description should not be construed as limitations of the present disclosure, but rather as a more detailed description of certain aspects, features and embodiments of the present disclosure.

It should be understood that the terms used in the present disclosure are only used to describe particular embodiments and are not intended to limit the present disclosure. In addition, for numerical ranges mentioned in the present disclosure, it should be understood that every intermediate value between the upper and lower limits of the range is also specifically disclosed. Each smaller range between any stated value or value intermediate within a stated range, and any other stated value or value intermediate within a stated range, is also included within the present disclosure. The upper and lower limits of these smaller ranges may independently be included or excluded from the range.

Test methods:
1. Arsenic removal rate:

$$\text{As removal rate} = \frac{C_0 \times V_0 - C_t \times V_t}{C_0 \times V_0} \times 100\%;$$

in the formula: $C_0$ represents the initial concentration of As in the solution; $V_0$ represents the initial solution volume; $C_t$ represents the residual As concentration of the solution obtained by filtration after treatment; and $V_t$ represents the volume of the solution obtained by filtration after treatment.

2. Leaching rate:

$$\text{leaching rate} = \frac{m_0 \times x_0 - m_1 \times x_1}{m_0 \times x_0} \times 100\%;$$

in the formula: $m_0$ is the weight of the raw materials for each test, $x_0$ is the content of a certain metal element in the raw materials, mi is the weight of the leaching residue (calculated as dry residue), and $x_1$ is the content of a certain metal element in the leaching residue.

Embodiment 1: a method for removing arsenic from copper smelting soot and comprehensive recovery of valuable metals, and the method comprises the following steps: performing pretreatment and subjecting oxidative acid leaching The pretreatment operation steps are as follows:

Step 1, alkali leaching: adding copper smelting soot into a stirring kettle, adding water and stirring, maintaining a liquid-to-solid ratio of 4:1, continuously adding 40 g/L of sodium hydroxide and 30 g/L of sodium sulfide, heating to increase the temperature, soaking and filtering to obtain the leachate and leaching residue;

Step 2 sedimentation: adding 10 g/L of lime into the leachate from Step 1, precipitating and filtering, continuously adding 5 g/L of polyaluminum chloride into the filtrate for flocculation and sedimentation to obtain filtrate and filter residue; and the filter residue is arsenic residue; and Step 3: the filtrate from Step 2 is returned to the stirring kettle of Step 1 and used as a circulating liquid; and the leaching residue from Step 1 is sent for oxidative acid leaching for further treatment.

The main components of the copper smelting soot include: 7.18% Cu, 23.05% Pb, 4.09% Bi, 10.91% Zn, 6.01% As, 1.56% Cd, 4.05% Fe, 1.18% Sn, 0.595% Sb, and 0.021% In.

The soaking temperature of Step 1 is 60° C., the leaching time is 60 min, and the stirring speed is 500 rpm.

Washing the pretreated leaching residue with water and subsequently sending it for oxidative acid leaching; and the oxidative acid leaching adopts a two-stage countercurrent method, and the operation steps are as follows:

A1 first-stage leaching: continuously introducing air during the leaching process, adding water and stirring, maintaining a liquid-to-solid ratio 3:1 and a temperature of 70° C., adding 60 g/L sulfuric acid, and reacting for 2 h; subsequently extracting In from the leachate using tributyl phosphate; then extracting Cu from the raffinate; and finally preparing basic zinc carbonate from the raffinate; and A2 second-stage leaching: continuously introducing air during the leaching process, adding water and stirring, maintaining a liquid-to-solid ratio of 3:1 and a temperature of 70° C., adding 120 g/L sulfuric acid, 10 g/L sodium chloride, and 0.02 g/L metal leaching synergist, reacting for 2 h, returning the second-stage leachate to the first-stage leaching process, and recycling for reuse; subsequently, neutralizing and hydrolyzing the leachate to separate Bi; finally reducing and smelting the leaching residue to recover Pb.

The preparation method of the metal leaching synergist is as follows:

stirring 5 g of 1,3,5-triazine-2,4,6 (1H,3H,5H)-trithione, trisodium salt, 0.07 g of 5,10,15,20-tetrakis(4-vinylphenyl) porphyrin, 0.6 g of acrylo polysilsesquioxane cage mixture (CAS: 221326-46-1), 120 g of toluene, and 0.5 g of photoinitiator, reacting for 50 minutes under the irradiation of 365 nm ultraviolet light, and then removing the toluene via reduced pressure distillation after the reaction is finished, to obtain the metal leaching synergist.

The photoinitiator is 2,2-dimethoxy-2-phenylacetophenone.

Embodiment 2: a method for removing arsenic from copper smelting soot and comprehensive recovery of valuable metals, and the method comprises the following steps: performing pretreatment and subjecting oxidative acid leaching The pretreatment operation steps are as follows:

Step 1, alkali leaching: adding copper smelting soot into a stirring kettle, adding water and stirring, maintaining a liquid-to-solid ratio of 4:1, continuously adding 44 g/L of sodium hydroxide and 34 g/L of sodium sulfide, heating to increase the temperature, soaking and filtering to obtain the leachate and leaching residue;

Step 2 sedimentation: adding 14 g/L of lime into the leachate from Step 1, precipitating and filtering, continuously adding 6 g/L of polyaluminum chloride into the filtrate for flocculation and sedimentation to obtain filtrate and filter residue; and the filter residue is arsenic residue; and Step 3: the filtrate from Step 2 is returned to the stirring kettle of Step 1 and used as a circulating liquid; and the leaching residue from Step 1 is sent for oxidative acid leaching for further treatment.

The main components of the copper smelting soot include: 7.18% Cu, 23.05% Pb, 4.09% Bi, 10.91% Zn, 6.01% As, 1.56% Cd, 4.05% Fe, 1.18% Sn, 0.595% Sb, and 0.021% In.

The soaking temperature of Step 1 is 65° C., the leaching time is 80 min, and the stirring speed is 550 rpm.

Washing the pretreated leaching residue with water and subsequently sending it for oxidative acid leaching; and the oxidative acid leaching adopts a two-stage countercurrent method, and the operation steps are as follows:

A1 first-stage leaching: continuously introducing air during the leaching process, adding water and stirring, maintaining a liquid-to-solid ratio 3:1 and a temperature of 75° C., adding 64 g/L sulfuric acid, and reacting for 3 h; subsequently extracting In from the leachate using tributyl phosphate; then extracting Cu from the raffinate; and finally preparing basic zinc carbonate from the raffinate; and A2 second-stage leaching: continuously introducing air during the leaching process, adding water and stirring, maintaining a liquid-to-solid ratio of 3:1 and a temperature of 75° C., adding 124 g/L sulfuric acid, 12 g/L sodium chloride, and 0.1 g/L metal leaching synergist, reacting for 3 h, returning the second-stage leachate to the first-stage leaching process, and recycling for reuse; subsequently, neutralizing and hydrolyzing the leachate to separate Bi; finally reducing and smelting the leaching residue to recover Pb.

The preparation method of the metal leaching synergist is as follows:

stirring 6 g of 1,3,5-triazine-2,4,6 (1H,3H,5H)-trithione, trisodium salt, 0.1 g of 5,10,15,20-tetrakis(4-vinylphenyl) porphyrin, 1 g of acrylo polysilsesquioxane cage mixture (CAS: 221326-46-1), 130 g of toluene, and 1 g of photoinitiator, reacting for 70 minutes under the irradiation of 365 nm ultraviolet light, and then removing the toluene via reduced pressure distillation after the reaction is finished, to obtain the metal leaching synergist.

The photoinitiator is 2,2-dimethoxy-2-phenylacetophenone.

Embodiment 3: a method for removing arsenic from copper smelting soot and comprehensive recovery of valuable metals, and the method comprises the following steps: performing pretreatment and subjecting oxidative acid leaching The pretreatment operation steps are as follows:

Step 1, alkali leaching: adding copper smelting soot into a stirring kettle, adding water and stirring, maintaining a liquid-to-solid ratio of 5:1, continuously adding 48 g/L of sodium hydroxide and 38 g/L of sodium sulfide, heating to increase the temperature, soaking and filtering to obtain the leachate and leaching residue;

Step 2 sedimentation: adding 18 g/L of lime into the leachate from Step 1, precipitating and filtering, continuously adding 8 g/L of polyaluminum chloride into the filtrate for flocculation and sedimentation to obtain filtrate and filter residue; and the filter residue is arsenic residue; and Step 3: the filtrate from Step 2 is returned to the stirring kettle of Step 1 and used as a circulating liquid; and the leaching residue from Step 1 is sent for oxidative acid leaching for further treatment.

The main components of the copper smelting soot include: 7.18% Cu, 23.05% Pb, 4.09% Bi, 10.91% Zn, 6.01% As, 1.56% Cd, 4.05% Fe, 1.18% Sn, 0.595% Sb, and 0.021% In.

The soaking temperature of Step 1 is 65° C., the leaching time is 100 min, and the stirring speed is 550 rpm.

Washing the pretreated leaching residue with water and subsequently sending it for oxidative acid leaching; and the oxidative acid leaching adopts a two-stage countercurrent method, and the operation steps are as follows:

A1 first-stage leaching: continuously introducing air during the leaching process, adding water and stirring, maintaining a liquid-to-solid ratio 4:1 and a temperature of 75° C., adding 68 g/L sulfuric acid, and reacting for 3 h; subsequently extracting In from the leachate using tributyl phosphate; then extracting Cu from the raffinate; and finally preparing basic zinc carbonate from the raffinate; and A2 second-stage leaching: continuously introducing air during the leaching process, adding water and stirring, maintaining a liquid-to-solid ratio of 4:1 and a temperature of 75° C., adding 128 g/L sulfuric acid, 14 g/L sodium chloride, and 0.2 g/L metal leaching synergist, reacting for 3 h, returning the second-stage leachate to the first-stage leaching process, and recycling for reuse; subsequently, neutralizing and hydrolyzing the leachate to separate Bi; finally reducing and smelting the leaching residue to recover Pb.

The preparation method of the metal leaching synergist is as follows:

stirring 8 g of 1,3,5-triazine-2,4,6 (1H,3H,5H)-trithione, trisodium salt, 0.15 g of 5,10,15,20-tetrakis(4-vinylphenyl) porphyrin, 2 g of acrylo polysilsesquioxane cage mixture (CAS: 221326-46-1), 150 g of toluene, and 2 g of photoinitiator, reacting for 90 minutes under the irradiation of 365 nm ultraviolet light, and then removing the toluene via reduced pressure distillation after the reaction is finished, to obtain the metal leaching synergist.

The photoinitiator is benzophenone.

Embodiment 4: a method for removing arsenic from copper smelting soot and comprehensive recovery of valuable metals, and the method comprises the following steps: performing pretreatment and subjecting oxidative acid leaching.

The pretreatment operation steps are as follows:

Step 1, alkali leaching: adding copper smelting soot into a stirring kettle, adding water and stirring, maintaining a liquid-to-solid ratio of 5:1, continuously adding 50 g/L of sodium hydroxide and 40 g/L of sodium sulfide, heating to increase the temperature, soaking and filtering to obtain the leachate and leaching residue;

Step 2 sedimentation: adding 20 g/L of lime into the leachate from Step 1, precipitating and filtering, continuously adding 10 g/L of polyaluminum chloride into the filtrate for flocculation and sedimentation to obtain filtrate and filter residue; and the filter residue is arsenic residue; and Step 3: the filtrate from Step 2 is returned to the stirring kettle of Step 1 and used as a circulating liquid; and the leaching residue from Step 1 is sent for oxidative acid leaching for further treatment.

The main components of the copper smelting soot include: 7.18% Cu, 23.05% Pb, 4.09% Bi, 10.91% Zn, 6.01% As, 1.56% Cd, 4.05% Fe, 1.18% Sn, 0.595% Sb, and 0.021% In.

The soaking temperature of Step 1 is 70° C., the leaching time is 120 min, and the stirring speed is 600 rpm.

Washing the pretreated leaching residue with water and subsequently sending it for oxidative acid leaching; and the oxidative acid leaching adopts a two-stage countercurrent method, and the operation steps are as follows:

A1 first-stage leaching: continuously introducing air during the leaching process, adding water and stirring, maintaining a liquid-to-solid ratio 4:1 and a temperature of 80° C., adding 70 g/L sulfuric acid, and reacting for 4 h; subsequently extracting In from the leachate using tributyl phosphate; then extracting Cu from the raffinate; and finally preparing basic zinc carbonate from the raffinate; and A2 second-stage leaching: continuously introducing air during the leaching process, adding water and stirring, maintaining a liquid-to-solid ratio of 4:1 and a temperature of 80° C., adding 130 g/L sulfuric acid, 15 g/L sodium chloride, and 0.3 g/L metal leaching synergist, reacting for 4 h, returning the second-stage leachate to the first-stage leaching process, and recycling for reuse; subsequently, neutralizing and hydrolyzing the leachate to separate Bi; finally reducing and smelting the leaching residue to recover Pb.

the preparation method of the metal leaching synergist is as follows:

stirring 10 g of 1,3,5-triazine-2,4,6 (1H,3H,5H)-trithione, trisodium salt, 0.2 g of 5,10,15,20-tetrakis(4-vinylphenyl) porphyrin, 2.5 g of acrylo polysilsesquioxane cage mixture (CAS: 221326-46-1), 160 g of toluene, and 2.5 g of photoinitiator, reacting for 100 minutes under the irradiation of 365 nm ultraviolet light, and then removing the toluene via reduced pressure distillation after the reaction is finished, to obtain the metal leaching synergist.

The photoinitiator is isopropyl thioxanthone.

Comparative embodiment 1: in this comparative embodiment, metal leaching synergist is not added, and all other conditions are the same as in Embodiment 1.

Comparative embodiment 2: in this comparative embodiment, 5,10,15,20-tetrakis(4-vinylphenyl) porphyrin is not added, and all other conditions are the same as in Embodiment 1.

Comparative embodiment 3: in this comparative embodiment, acrylo polysilsesquioxane cage mixture is not added, and all other conditions are the same as in Embodiment 1.

TABLE 1

Test results of various embodiments and comparative embodiments

| | Arsenic removal rate % | Copper leaching rate % | Zinc leaching rate % | Indium leaching rate % | Lead leaching rate % | Bismuth leaching rate % |
|---|---|---|---|---|---|---|
| Embodiment 1 | 99.55 | 98.31 | 98.11 | 97.62 | 97.52 | 97.34 |
| Embodiment 2 | 99.64 | 98.78 | 99.58 | 98.02 | 97.84 | 97.61 |
| Embodiment 3 | 99.73 | 99.13 | 98.95 | 98.66 | 98.26 | 98.13 |
| Embodiment 4 | 99.85 | 99.52 | 99.32 | 99.04 | 98.83 | 98.57 |
| Comparative embodiment 1 | 85.19 | 82.37 | 81.86 | 79.98 | 79.15 | 78.76 |
| Comparative embodiment 2 | 89.12 | 88.09 | 86.57 | 85.32 | 85.17 | 84.88 |
| Comparative embodiment 3 | 92.36 | 90.11 | 88.93 | 88.06 | 87.89 | 86.83 |

Through data analysis of the embodiment and comparative embodiments, the present disclosure demonstrates that the arsenic removal rate is high, and the valuable metal leaching rates for Cu, Zn, Pb, Bi, In, and the like are also high, enabling step-by-step recovery to be achieved.

The above are only the preferred embodiments of the present disclosure It should be noted that, for a person of ordinary skill in the art, numerous improvements and modifications can be made without departing from the principles of the present disclosure, and such improvements and modifications should also be considered within the scope of protection of the present disclosure.

What is claimed is:

1. A method for removing arsenic from copper smelting soot and comprehensive recovery of valuable metals, wherein the method comprises the following steps: performing pretreatment and subjecting oxidative acid leaching; specifically, washing the pretreated leaching residue with water and subsequently sending it for oxidative acid leaching; and the oxidative acid leaching adopts a two-stage countercurrent method, and the operation steps are as follows:
   A1 first-stage leaching: continuously introducing air during the leaching process, adding water and stirring, maintaining a liquid-to-solid ratio (3-4): 1 and a temperature of 70-80° C., adding 60-70 g/L sulfuric acid, and reacting for 2-4 h; subsequently extracting In from the leachate using tributyl phosphate; then extracting Cu from the raffinate; and finally preparing basic zinc carbonate from the raffinate; and
   A2 second-stage leaching: continuously introducing air during the leaching process, adding water and stirring, maintaining a liquid-to-solid ratio of (3-4): 1 and a temperature of 70-80° C., adding 120-130 g/L sulfuric acid, 10-15 g/L sodium chloride, and 0.02-0.3 g/L metal leaching synergist, reacting for 2-4 h, returning the second-stage leachate to the first-stage leaching process, and recycling for reuse; subsequently, neutralizing and hydrolyzing the leachate to separate Bi; finally reducing and smelting the leaching residue to recover Pb;
   the preparation method of the metal leaching synergist is as follows:
   according to parts by weight, stirring 5-10 parts of 1,3,5-triazine-2,4,6 (1H,3H,5H)-trithione, trisodium salt, 0.07-0.2 part of 5,10,15,20-tetrakis(4-vinylphenyl) porphyrin, 0.6-2.5 parts of acrylo polysilsesquioxane cage mixture, 120-160 parts of toluene, and 0.5-2.5 parts of photoinitiator, reacting for 50-100 minutes under the irradiation of 365 nm ultraviolet light, and then removing the toluene via reduced pressure distillation after the reaction is finished, to obtain the metal leaching synergist.

2. The method for removing arsenic from copper smelting soot and comprehensive recovery of valuable metals according to claim 1, wherein the pretreatment operation steps are as follows:
   Step 1, alkali leaching: adding copper smelting soot into a stirring kettle, adding water and stirring, maintaining a liquid-to-solid ratio of (4-5): 1, continuously adding 40-50 g/L of sodium hydroxide and 30-40 g/L of sodium sulfide, heating to increase the temperature, soaking and filtering to obtain the leachate and leaching residue;
   Step 2 sedimentation: adding 10-20 g/L of lime into the leachate from Step 1, precipitating and filtering, continuously adding 5-10 g/L of polyaluminum chloride into the filtrate for flocculation and sedimentation to obtain filtrate and filter residue; and the filter residue is arsenic residue; and
   Step 3: the filtrate from Step 2 is returned to the stirring kettle of Step 1 and used as a circulating liquid; and the leaching residue from Step 1 is sent for oxidative acid leaching for further treatment.

3. The method for removing arsenic from copper smelting soot and comprehensive recovery of valuable metals according to claim 2, wherein the main components of the copper smelting soot include: 7.18% Cu, 23.05% Pb, 4.09% Bi, 10.91% Zn, 6.01% As, 1.56% Cd, 4.05% Fe, 1.18% Sn, 0.595% Sb, and 0.021% In.

4. The method for removing arsenic from copper smelting soot and comprehensive recovery of valuable metals according to claim 2, wherein the soaking temperature of Step 1 is 60-70° C., the leaching time is 60-120 min, and the stirring speed is 500-600 rpm.

5. The method for removing arsenic from copper smelting soot and comprehensive recovery of valuable metals according to claim 1, wherein the photoinitiator is one of 2,2-dimethoxy-2-phenylacetophenone, benzophenone, benzoin dimethyl ether and isopropyl thioxanthone.

* * * * *